United States Patent [19]

Ackerman

[11] Patent Number: 5,772,371
[45] Date of Patent: Jun. 30, 1998

[54] CARGO NETS AND FITTINGS THEREFOR

[75] Inventor: David Ackerman, Dorchester, Great Britain

[73] Assignee: Bridport-Gundry plc, Bridport, England

[21] Appl. No.: 559,639

[22] Filed: Nov. 20, 1995

[30] Foreign Application Priority Data

Nov. 22, 1994 [GB] United Kingdom .................. 9423513

[51] Int. Cl.[6] .............................. B61D 45/00; B60P 7/16
[52] U.S. Cl. ............................ 410/118; 410/97; 410/117; 24/129 R
[58] Field of Search .............................. 410/97, 117, 118, 410/100, 96; 24/129 B, 128, 129 R, 130; 280/749; 296/100; 87/12, 53, 324, 56, 57

[56] References Cited

U.S. PATENT DOCUMENTS

| | | | |
|---|---|---|---|
| 891,059 | 6/1908 | Greer ................................. | 24/129 B X |
| 2,508,491 | 5/1950 | Cayo ................................. | 24/129 B X |
| 2,705,461 | 4/1955 | Campbell ................................. | 410/97 |
| 2,950,691 | 8/1960 | Huber ................................. | 410/118 X |
| 3,079,657 | 3/1963 | Russell . | |
| 3,173,539 | 3/1965 | Looker ................................. | 410/97 X |
| 3,335,468 | 8/1967 | Harley ................................. | 24/128 X |
| 3,961,585 | 6/1976 | Brewer ................................. | 410/97 |
| 4,000,344 | 12/1976 | Dilbey . | |
| 4,158,985 | 6/1979 | Looker et al. . | |
| 4,330,890 | 5/1982 | Weber-Unger . | |
| 5,121,958 | 6/1992 | Goeden et al. ................................. | 410/117 X |
| 5,193,955 | 3/1993 | Chou ................................. | 410/100 |
| 5,328,310 | 7/1994 | Lockney ................................. | 410/97 |

FOREIGN PATENT DOCUMENTS

| | | | |
|---|---|---|---|
| 2336505 | 7/1977 | France . | |
| 2044960 | 3/1972 | Germany . | |
| 2854505 | 6/1980 | Germany ................................. | 410/117 |
| 2915702 | 10/1980 | Germany . | |
| 4002534 | 1/1992 | Japan ................................. | 410/97 |
| 9104870 | 4/1991 | WIPO . | |

*Primary Examiner*—Stephen Gordon
*Attorney, Agent, or Firm*—Dennison, Meserole, Pollack & Scheiner

[57] ABSTRACT

A cargo net includes a plurality of interconnected strands defining a border wherein a plurality of tensioning fittings are mounted and wherein each fitting is formed with a closed ring-like portion having at least one integral prong projecting inwardly of the ring. Constrictions on the prong and ring cooperate to retain a selected strand of the net in position over the prong. A closed eyelet opposite the prong receives another strand of the net.

4 Claims, 2 Drawing Sheets

CARGO NETS AND FITTINGS THEREFOR

This invention relates to cargo nets of the kind used for securing loads to a platform or pallet and which require to be tensioned in order the better to secure such loads, and the invention has particular reference to fittings for effecting such tensioning.

Conventionally, such nets comprise a rectangular main panel, having at each of two opposite sides a rectangular wing panel thus forming a cruciform structure. The main panel is adapted to be positioned so as to extend over what is, so to speak, the crown and the two opposite ends of the load and the wing panels are adapted to depend from the main panel at the crown of the load and extend down over the sides of the load; meeting edges of the wing panels and end portions of the main panel may be secured together, and the two end edges of the main panel and a distal side of each wing panel are secured to the pallet or platform upon which the load is sited.

As loads may vary in size and shape, it is necessary to take up any slack in the net after covering the load so as to secure it. This is conventionally done using tensioning hooks secured to the net near its borders. Such hooks are of typical hook form and comprise hook and eye portions, and the hooks are permanently tethered to the net at or near its borders by their eyes. Hooks tethered near the net borders can then be hooked around netting strands which are located inwardly of the borders of the net to make a tuck and thereby tension the net over the load.

Such tensioning hooks are conveniently tethered by their eyes in rows adjacent the net borders, and as the hooks are of typical hook form, there occurs the inconvenience of snagging when the nets are removed from engagement with the pallet and the load while the net is not in use. Disentangling of a snagged net wastes precious time. The gape of such hooks could be closed, as is known, by a spring urged latch bar; but such fittings are expensive and are subject to wear or contamination by dirt and failure.

The present invention aims to alleviate this problem by providing a tensioning fitting which is less prone to snagging than currently used tensioning hooks, and which can be manufactured easily and inexpensively.

According to the present invention there is provided a tensioning fitting for a cargo net which is in the form of a closed ring member having at least one fixed prong which projects inwardly of such ring member defining a gape on each side thereof in which a net strand may seat after being looped over the prong.

Such a tensioning fitting is less prone to snagging than a conventional tensioning hook which is not closed by a spring urged latch bar; and is less expensive and less subject to wear or contamination by dirt and failure than a tensioning hook which is closed by such a spring urged latch bar.

Such a tensioning fitting is preferably formed as an integral casting. This is a very simple and inexpensive way of forming the fitting.

Various materials may be used for the manufacture of a tensioning fitting in accordance with this invention. Among suitable materials are metals, for example brass, and synthetic materials such as fibre reinforced plastics materials. In order to achieve the combined advantages of light weight, strength and robustness, and resistance to corrosion, it is preferred that the tensioning fitting be formed of an aluminum alloy.

Advantageously, each of the two gapes on either side of a said prong comprises a constriction above its base. Suitable sizing of such a constriction in relation to the thickness of strands of the net with which the tensioning fitting is to be used allows the net strand to be a tight push fit past the constriction thus militating against accidental disengagement of the tensioning fitting from the net.

Avoidance of accidental snagging of the fitting is promoted if, as is preferred, the tip of a said prong lies substantially on a mid plane of said ring member.

In some preferred embodiments of the invention, said ring member comprises an eyelet opposite a said prong. Such an eyelet is a convenient means for permanently attaching such a fitting to a cargo net.

In other preferred embodiments of the invention, said ring member comprises a pair of opposed prongs. Such a fitting may conveniently be provided for temporary attachment to a cargo net.

The invention extends to a cargo net equipped with a plurality of net tensioning fittings according to the invention.

Thus, the invention also relates to the combination of a net and, tethered at or adjacent its borders a plurality of such tensioning fittings each formed with a prong directed inwardly of a closed ring, the net comprising a plurality of strands, and in which at the location of at least the majority of strand intersections located inwardly of the edge of the net, there are at least two intersecting strand length portions and with each of such two strand length portions including a hole through the body thereof through which the other of them passes as a body. Preferably, the said tensioning fittings are permanently tethered in rows adjacent the net borders. Where such a net has wings, the tensioning fittings will be tethered near the borders of the wings.

This net may be further characterised in that at each net intersection between two strands, one of the strands has a second hole adjacent the first hole, the other strand being passed as a body through this second hole. A net so formed will therefore have, at each such intersection between two strands, one strand with two holes in it with the other strand passing as a body through both of these holes, the said other strand itself having a hole through which passes the first mentioned strand as a body.

In preferred embodiments of net according to the invention, there is a border cord which extends around at least a part of the periphery of the net and, at at least some of the junctions between strand length portions and such border cord, the border cord passes as a body through two holes in a strand length portion and the strand length passes as a body through a hole in the border cord.

When a net is made with its individual intersections formed according to this invention, the strands forming the net may be made to extend, from one border of the net to the other. Thus there will be one set of individual strands extending between the North and South borders of the net, while other strands intersect the strands of the first set and these other strands will extend between the East and West borders of the net. Such a net will have generally equivalent ultimate strength both in the North-South and in the East-West directions.

In an alternative construction, the strands, all of them, may extend in zigzag fashion, either between the North and South borders or between the East and West borders. In such a construction each individual strand, as it extends across the net, intersects alternately with its two immediately neighbouring strands. Such a net will be stronger in the direction of extension of the strands than in the transverse direction.

The net just described will have so-called "diamond" meshes, while the net type mentioned above will have so-called "square" meshes.

A complete net may be made up from a number of net panels. These panels may be of the same type of mesh or the meshes may differ. Panels will be joined by intersections between adjacent net cords as required or by using a separate cord to form intersections with the cords of the panels to be joined.

Nets according to the invention are especially suitable for use as cargo nets to anchor loads onto pallets. Nets intended for such use may be made cruciform in shape with a central panel area equal to the size of the pallet in conjunction with which it is desired to use the net, and four rectangular wing panel portions projecting therefrom for a distance equal to the maximum height to which the pallet is to be loaded.

When intended for use in this way, it is especially suitable to make a net according to the invention from a coreless braided or plaited nylon cord having a breaking strength of the order of 1,000 to 2,000 kilograms.

The present invention will now be described in greater detail with reference to the accompanying drawings in which.

Figure 1:
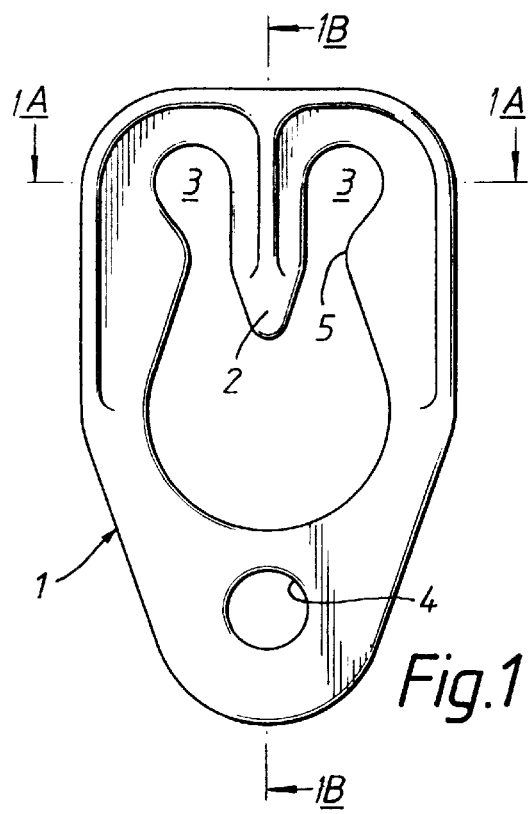
FIG. 1 is an elevation of one embodiment of a tensioning fitting according to this invention.

The embodiment of tensioning fitting for a cargo net according to the invention which is shown in FIG. 1 is formed as a closed ring member 1 having a fixed prong 2 which projects inwardly of such ring member 1 defining a gape 3 on each side thereof in which a net strand may seat after being looped over the prong 2.

The closed ring 1 has a tethering eyelet 4 opposite the prong 2, so that the prong 2 extends inwardly into the region bounded by the ring member 1 in the direction towards the eyelet 4. Each of the two gapes 3 on either side of the prong 2 comprises a constriction 5 above its base.

Such a tensioning fitting, in the form of a prong extending inwardly of a closed ring, especially when the tip of a said prong lies substantially on a mid plane (M in FIGS. 1A and 1B) of said ring member, will give less risk of snagging than will be the case with the conventional open hook.

The tensioning fitting can be a unitary component which may easily and cheaply be made, e.g. as an integral casting, from a variety of materials, e.g. an aluminum alloy; and as such it will be simpler, more economical and more reliable than an open hook with a spring loaded latch closing its gape.

Figure 1A:
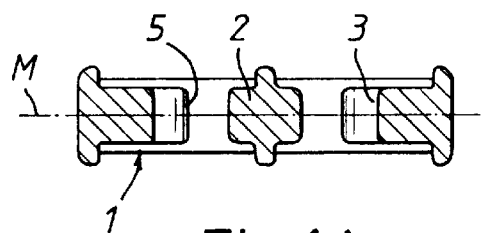
FIGS. 1A and 1B are respectively cross-sectional views along the lines A and B of FIG. 1.
Figure 1B:
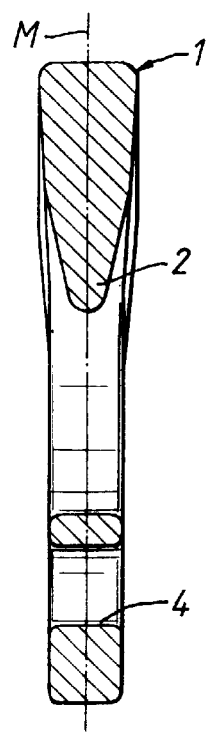
Figure 2:
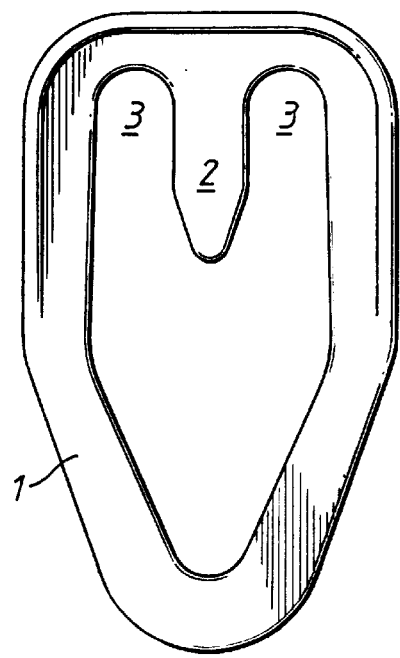
FIGS. 2, 3 and 4 are respectively elevations of three further embodiments of tensioning fitting according to this invention.

A simplified version of the embodiment of FIGS. 1, 1A and 1 B is shown in FIG. 2. In the embodiment of tensioning fitting shown in FIG. 2, there is no tethering eyelet as such, and the fitting may be tethered by simply securing the ring 1 to the net near its border. Also in the embodiment of FIG. 2, it will be noted that the gapes 3 are not constricted.

Figure 3:
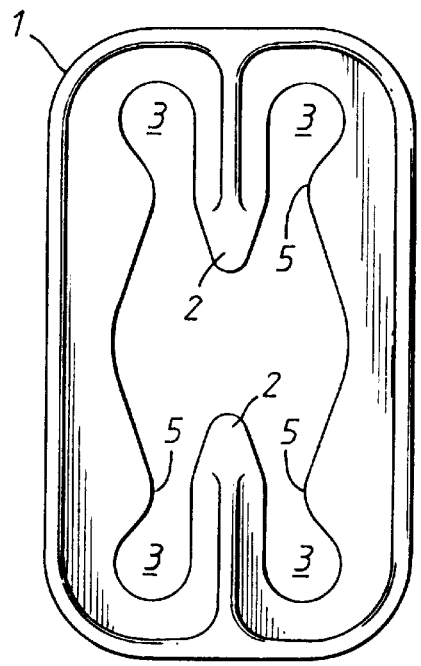

In the embodiment of FIG. 3, the ring 1 has a second inwardly directed prong 2 which is used for tethering and in this case the second prong and the neighbouring part of the ring 1 defining the gapes 3 to either side of that second prong 2 are so shaped as to provide constrictions 5 so that once engaged with the prong, a net strand is difficult to disengage and the tensioning fitting is thereby tethered.

Figure 4:
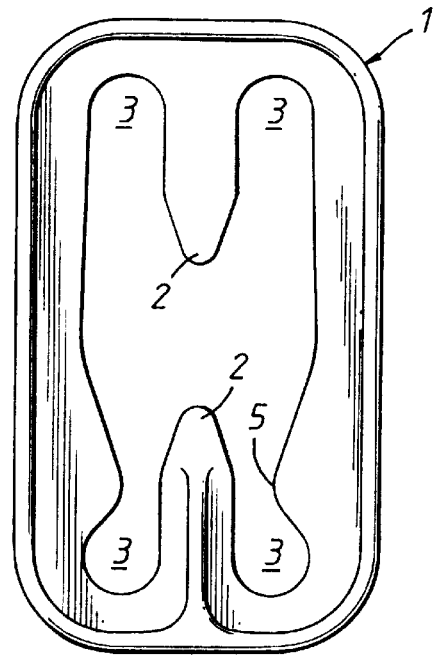

FIG. 4 shows a modification of the embodiment of FIG. 3, in which the second prong 2 and the neighbouring part of the ring 1 are not so shaped as to define constrictions in the gapes 3 (compare the FIG. 2 embodiment). Closed ring type tensioning fittings may be permanently tethered at locations within about 10 cm from the border of the net or of the border of the wing of the net. Or they may be secured to a border cord of the net.

Figure 5:
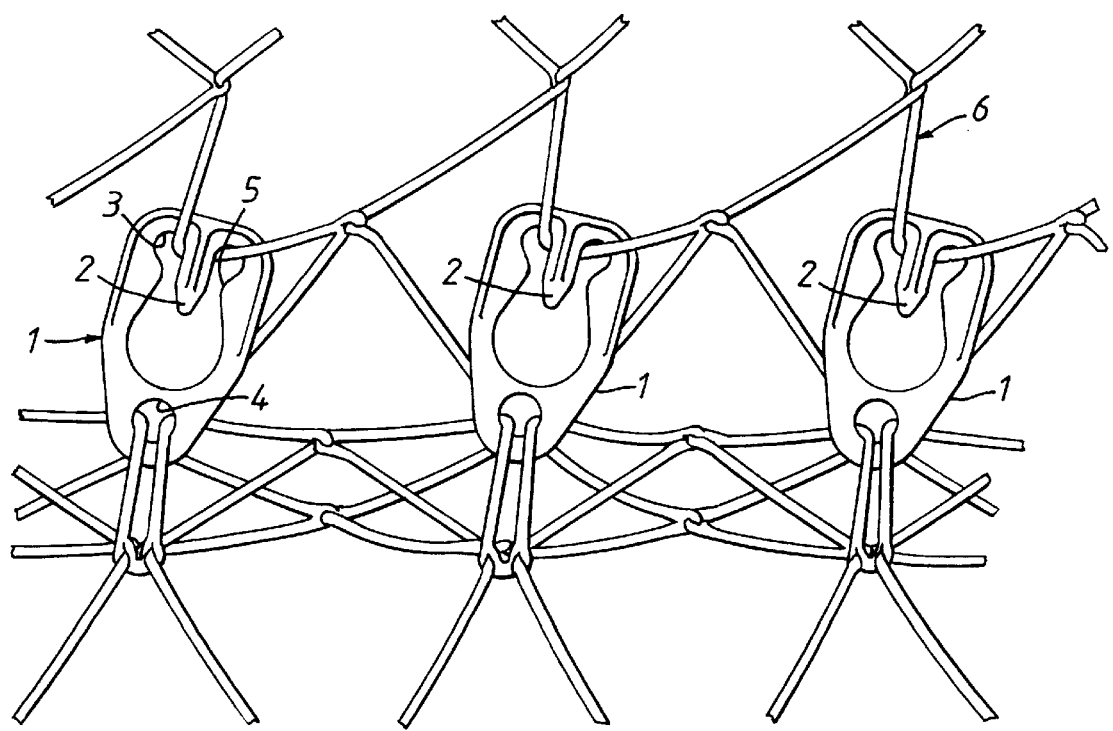
FIG. 5 is a general view showing tensioning fittings according to FIG. 1 being used for tensioning a net.

FIG. 5 shows a plurality of tensioning fittings according to this embodiment and as described above in relation to FIGS. 1 in use for tensioning a cargo net shown at 6.

What is claimed is:

1. A cargo net comprising a plurality of interconnected strands having a surrounding border, wherein there is provided a plurality of net tensioning fittings attached to the net adjacent its border, and wherein each said fitting is formed with a closed ring portion having at least one integral prong which projects inwardly of such ring portion defining a gape on each side of said prong to provide a mouth, and a necked down constriction between said prong and said ring portion over which prong a said net strand is positioned whereby said fitting is engaged with such net strand to tension the net, such prong terminating in a tip which lies substantially on a mid plane of said ring portion, thereby inhibiting unintended engagement of said prong with a strand of said cargo net, and wherein said ring portion of a said tensioning fitting includes a closed eyelet opposite said prong through which another of said strands extends.

2. A cargo net according to claim 1 wherein said strands are formed by coreless braided or plaited nylon cords having a breaking strength of the order of 1000 to 2000 kilograms.

3. A cargo net according to claim 1, wherein such tensioning fittings are each formed as an integral casting.

4. A cargo net according to claim 1, wherein such tensioning fittings are formed of an aluminum alloy.

* * * * *